United States Patent
Katoh et al.

(10) Patent No.: US 9,025,039 B2
(45) Date of Patent: May 5, 2015

(54) IMAGE PICKUP APPARATUS AND IMAGE BLUR CORRECTING METHOD FOR PERFORMING IMAGE BLUR CORRECTION BASED ON AT LEAST ONE OF SHUTTER SPEED AND AMOUNT OF IMAGE BLUR WHEN TAKING IMAGE

(71) Applicant: JVC Kenwood Corporation, Yokohama-shi, Kanagawa (JP)

(72) Inventors: Hidehiro Katoh, Tokyo (JP); Takashi Sueda, Ichikawa (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 237 days.

(21) Appl. No.: 13/713,816

(22) Filed: Dec. 13, 2012

(65) Prior Publication Data

US 2013/0155262 A1 Jun. 20, 2013

(30) Foreign Application Priority Data

Dec. 14, 2011 (JP) ................................. 2011-273254

(51) Int. Cl.
*H04N 5/225* (2006.01)
*H04N 5/232* (2006.01)
(52) U.S. Cl.
CPC ....... *H04N 5/23267* (2013.01); *H04N 5/23274* (2013.01); *H04N 5/23283* (2013.01); *H04N 5/23287* (2013.01)
(58) Field of Classification Search
USPC .................................................... 348/208.5
See application file for complete search history.

(56) References Cited

U.S. PATENT DOCUMENTS

| | | | |
|---|---|---|---|
| 2007/0183765 A1 | 8/2007 | Imamura | |
| 2008/0175574 A1* | 7/2008 | Tomita et al. | 396/55 |
| 2009/0316010 A1* | 12/2009 | Nomura | 348/208.6 |
| 2011/0157381 A1* | 6/2011 | Miyasako | 348/208.5 |
| 2012/0262590 A1* | 10/2012 | Yumiki | 348/208.5 |
| 2012/0293672 A1* | 11/2012 | Nonaka et al. | 348/208.5 |
| 2013/0063615 A1* | 3/2013 | Takeuchi | 348/208.5 |

FOREIGN PATENT DOCUMENTS

EP  0 656 725 A1  6/1995
JP  2011-145604 A  7/2011

OTHER PUBLICATIONS

European Patent Office, Search Report, Application No. EP 12 00 8310, issued Apr. 3, 2013, seven (7) pages.

* cited by examiner

*Primary Examiner* — Twyler Haskins
*Assistant Examiner* — Dwight C Tejano
(74) *Attorney, Agent, or Firm* — Nath, Goldberg & Meyer; Jerald D. Meyer; Leonid D. Thenor (57) ABSTRACT

An image pickup apparatus includes an image-blur-amount calculation unit that calculates an image blur amount of a dynamic picture image, based on a blur of a main body unit when taking the dynamic picture image and an optical correction unit that optically corrects a blur of the dynamic picture image, an electronic correction unit that electronically corrects the image blur, a shutter-speed calculation unit that calculates a shutter speed of the imaging unit, and an image-blur-correction control unit that calculates an optical correction amount by the optical correction unit and optically corrects the image blur based on the optical correction amount, and also calculates an electronic correction amount by the electronic correction unit and electronically corrects the image blur based on the electronic correction amount, based on at least one of the amount of image blur and the shutter speed.

6 Claims, 8 Drawing Sheets

IMAGE PICKUP APPARATUS AND IMAGE BLUR CORRECTING METHOD FOR PERFORMING IMAGE BLUR CORRECTION BASED ON AT LEAST ONE OF SHUTTER SPEED AND AMOUNT OF IMAGE BLUR WHEN TAKING IMAGE

CROSS-REFERENCE TO RELATED APPLICATION

The present application claims the benefit of priority under 35U.S.C.§119 to Japanese Patent Application No. 2011-273254, filed on Dec. 14, 2011, the entire content of which is incorporated herein by reference.

BACKGROUND

1. Technical Field

The present invention relates to an image pickup apparatus and an image blur correcting method, in particular, relates to an image pickup apparatus and an image blurring correcting method for performing optical blur correction and electronic blur correction in combination, based on at least one of a shutter speed and an amount of image blur when taking an image.

2. Background Arts

In an image pickup apparatus using an imaging sensor, such as CCD (Charge Coupled Device) and CMOS (Complementary Metal Oxide Semiconductor), a technique of correcting an image blur derived from user's camera shaking in taking an image is growing popular.

As the technology of correcting this image blur, there are one method of correcting an image blur optically called "Optical image stabilization" and another method of correction an image blur electronically, called "Digital image stabilization" well known in the art. The optical blur correction means a method of correcting a blur of a captured image optically by changing an optic angle of incident light on an imaging sensor. The electronic blur correction means a method of correcting a blur of a captured image electronically by changing an output area of image data to be outputted (cut out) from captured image data stored in a memory temporarily.

In recent years, there has been developed an image pickup apparatus which performs an image-blur correction by a combination of optical blur correction and electronic blur correction. Japanese Patent Laid-open Publication No. 2011-145604 discloses an image pickup apparatus using optical blur correction and electronic blur correction in combination with alternation of the correction ratio between these corrections according to the optical zoom factor of an imaging optics system, such as a lens unit. According to this image pickup device, it is possible to enlarge a correctable range for image blur while suppressing

SUMMARY

Meanwhile, the optical blur correction and the electronic blur correction have respective advantages. For example, in the electronic blur correction, when the shutter speed of an electronic shutter in an imaging sensor gets slow in taking a dynamic picture image, there is a possibility of causing a blurring in the pickup image due to the effects of user's hand shaking or subject movement during the period of exposure. The blur mentioned above will be called an "exposure blurring" below. On the other hand, the optical blur correction has an advantage of causing an exposure blurring in a pickup image with difficulty irrespective of the shutter speed of the electronic shutter.

In the electronic blur correction, additionally, there is a case that an exposure blurring is easier to occur in a pickup image as the image blurring due to user's hand shaking etc. in taking an image gets larger. On the contrary, the optical blur correction has an advantage of causing an exposure blurring of the pickup image with difficulty, irrespective of the magnitude of the image blurring.

On the other hand, the power consumption for optical blur correction becomes larger than that for electronic blur correction since a drive control to physically move an imaging sensor, a prism or a shift lens etc. is executed in the optical blur correction. In other words, the electronic blur correction has an advantage in view of reducing the power consumption of batteries mounted on the image pickup apparatus.

Accordingly, it is desired to correct an image blur by either switching between the optical blur correction and the electronic blur correction or combining them with each other while utilizing respective advantages of both blur corrections.

Under the above-mentioned desire, an object of the present invention is to provide an image pickup apparatus and an image blur correcting method, which enable an execution of appropriate image blur correction by using respective advantages of the optical blur correction and the electronic blur correction in combination.

In order to achieve the above object, according to the present invention, there is provided an image pickup apparatus comprising: a main body unit that includes an imaging unit that takes a dynamic picture image and a memory unit that temporarily stores the dynamic picture image taken by the imaging unit; an image-blur-amount calculation unit that calculates an image blur amount of the dynamic picture image, based on a blur of the main body unit in taking the dynamic picture image; and an optical correction unit that optically corrects an image blur of the dynamic picture image by correcting an incident light on the imaging unit. The image pickup apparatus further comprises an electronic correction unit that electronically corrects the image blur of the dynamic picture image by cutting out an image having a designated area from the dynamic picture image temporarily stored in the memory unit; a shutter-speed calculation unit that calculates a shutter speed of the imaging unit; and an image-blur-correction control unit that executes control of calculating an optical correction amount by the optical correction unit and allowing the optical correction unit to optically correct the image blur based on the optical correction amount, and also calculating an electronic correction amount by the electronic correction unit and allowing the electronic correction unit to electronically correct the image blur based on the electronic correction amount, based on at least one of the amount of image blur and the shutter speed both calculated.

In addition, there is also provided an image blur correcting method comprising: storing a dynamic picture image taken by an imaging unit of an image pickup apparatus in a memory unit, temporarily; calculating an image blur amount of the dynamic picture image, based on a blur of the image pickup apparatus in taking the dynamic picture image; and calculating a shutter speed in taking the dynamic picture image. The image blur correcting method further comprises, based on at least one of the amount of image blur and the shutter speed both calculated, calculating an optical correction amount and further correcting the image blur based on the optical correction amount optically and also calculating an electronic correction amount and further correcting the image blur based on the electronic correction amount electronically.

DETAILED DESCRIPTION

Referring to the drawings, preferable embodiments of an image pickup apparatus and an image blur correcting method of an embodiment of the present invention will be described below. Concrete numerals etc. indicated in this embodiment are nothing but examples for facilitating understanding of the invention and are not restrictive unless otherwise noted. In this specification and the drawings, elements substantially identical in function and constitution to each other are indicated with the same reference numerals and their overlapping descriptions are eliminated. In addition, elements directly unrelated to the present invention are not shown in the figures.

An image pickup apparatus (digital video camera) 1 of this embodiment enables an appropriate image blur correction while utilizing respective advantages of the optical blur correction and the electronic blur correction by either switching between the optical blur correction and the electronic blur correction or changing respective image blur correction amounts by both of the blur corrections, corresponding to the shutter speed and the image blur amount requiring to be corrected in taking an image. The image pickup apparatus 1 will be described in detail, below.

Note that the present invention is also applicable to any of various digital cameras (e.g. so-called compact digital camera, digital single-lens reflex camera, etc.), various mobile computers (e.g. cell-phone, PDA (Personal Digital Assistant), etc.) and the other electronics, as long as it can take a dynamic picture image.

(Image Pickup Device 1)

Figure 1:
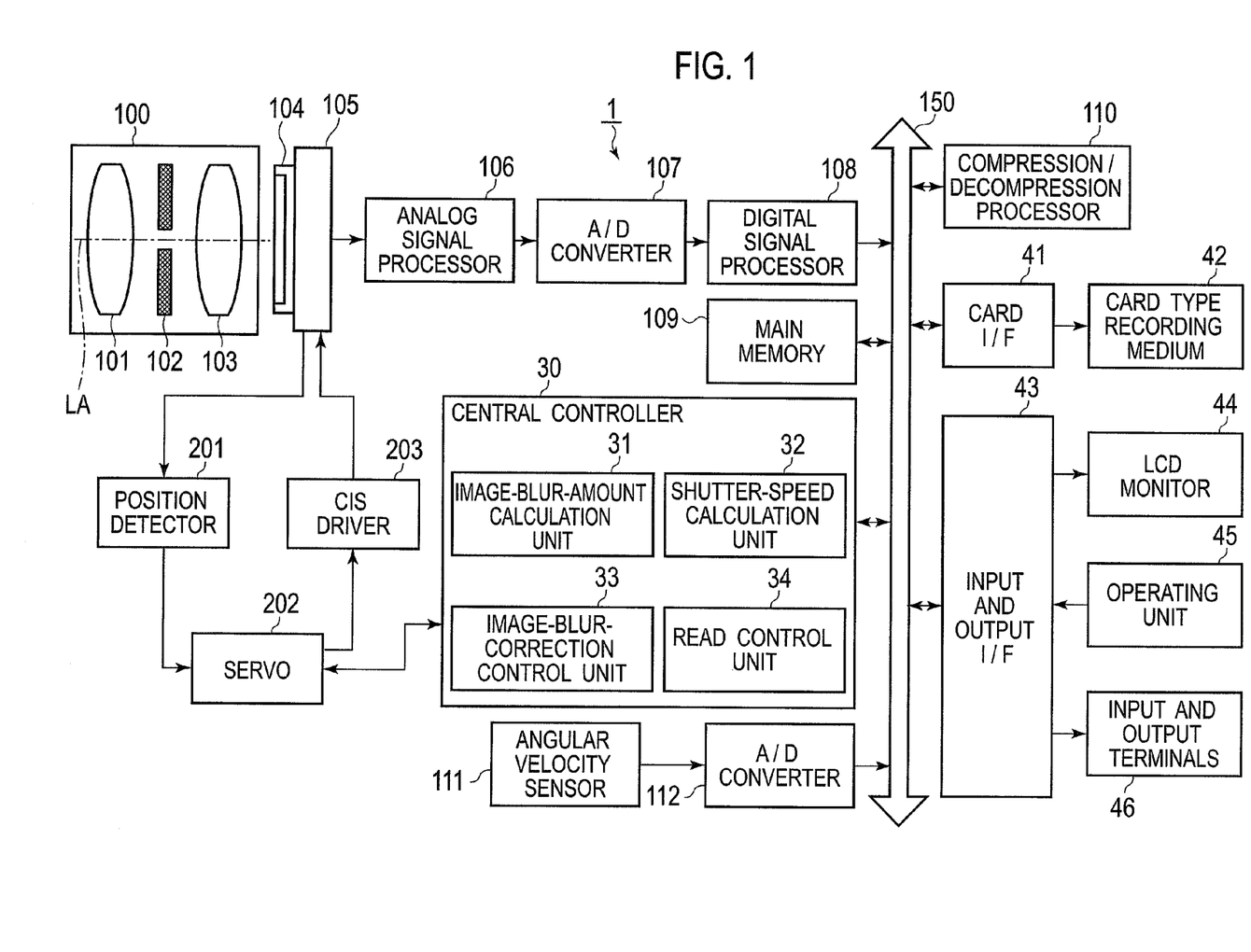
FIG. 1 is a block diagram showing a schematic internal constitution of an image pickup apparatus (digital video camera) 1 in accordance with an embodiment of the present invention.
Figure 2:
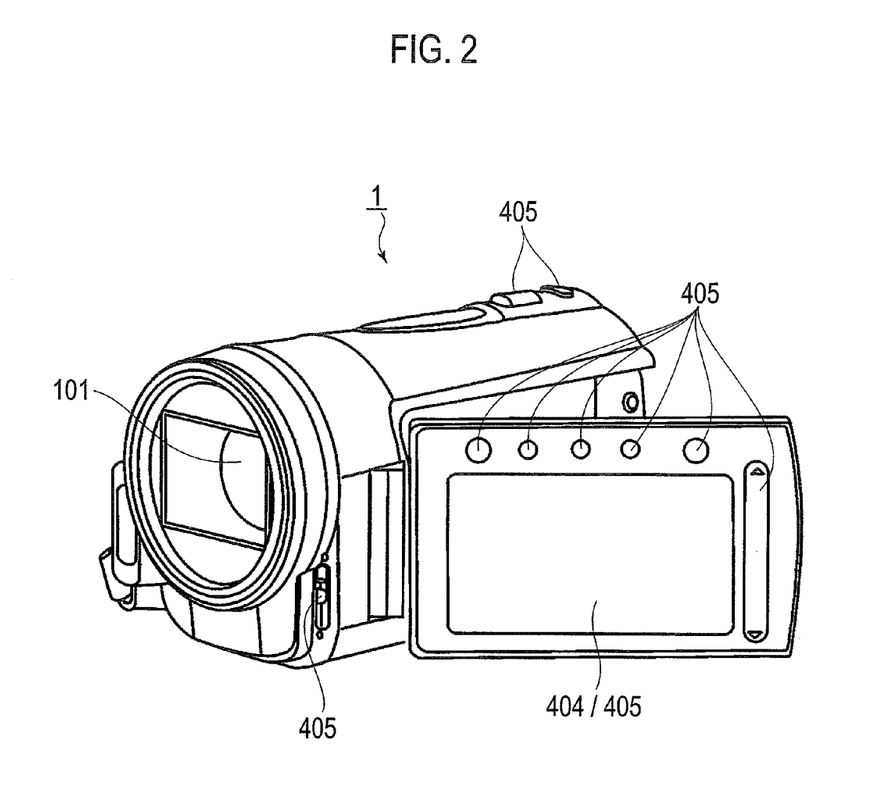
FIG. 2 is a view showing the appearance of the image pickup apparatus 1 of this embodiment.

FIG. 1 is a block diagram showing a schematic internal constitution of the image pickup apparatus 1, and FIG. 2 is a view showing the appearance of the image pickup apparatus 1. Below, the image pickup apparatus 1 will be described with reference to FIGS. 1 and 2.

A central controller 30 is constructed by a semiconductor integrated circuit including CPU (Central Processing Unit), ROM (Read Only Memory) storing various programs, RAM (Random Access Memory) as a working area and so on. In operation, the central controller 30 generally controls a variety of processes that the image pickup apparatus 1 executes, for example, imaging process, displaying and registering of various images, later-mentioned optical blur correcting process and electronic blur correcting process etc.

The central controller 30 also has functions operating as an image-blur-amount calculation unit 31, a shutter-speed calculation unit 32, an image-blur-correction control unit 33 and a read control unit 34 in the optical blur correcting process and the electronic blur correcting process by the image pickup apparatus 1, both of which will be described later.

The image pickup apparatus 1 includes an optical unit 100 composed of a zoom lens 101, an aperture 102 and a focus lens 103. The zoom lens 101 is moved along an optical axis LA by a not-shown zoom actuator. Similarly, the focus lens 103 is moved along the optical axis LA by a not-shown focus actuator. The aperture 102 is driven by a not-shown aperture actuator for exposure adjustment.

The image pickup apparatus 1 includes an imaging sensor 104 mounted on an optical blur correction unit 105. The imaging sensor 104 comprises a CMOS (Complementary Metal Oxide Semiconductor) sensor, a CCD (Charge Coupled Device) or the like. The optical blur correcting process by the driving of the optical blur correction unit 105 will be described in detail later.

The imaging operation of a dynamic picture image by the image pickup apparatus 1 is performed according to the following procedure. The imaging sensor 104 converts light passing through the zoom lens 101, the aperture 102 and the focus lens 103 photo-electrically to produce analog image signals of a subject image.

An analog signal processor 106 amplifies the analog image signals and successively, an A/D converter 107 converts so-amplified signals to digital image signals. The digital image signals outputted from the A/D converter 107 are then subjected to a predetermined signal processing by a digital signal processor 108 to convert them to pickup image data consisting of luminance signals and color-difference signals. The digital signal processor 108 also performs a variety of digital processing including offset processing, white-balance adjustment, gamma correction, RGB interpolation, noise-reduction processing, contour correction, color-tone correction, light-source type judgment, etc.

The digital signal processor 108 stores the pickup image data in a main memory 109 through a bus 150, based on a command from the central controller 30.

Following an instruction transmitted from the central controller 30 through the bus 150, a compression/decompression processor 110 applies a predetermined compression on various types of data stored in the main memory 109 to produce compressed data. In addition, following an instruction from the central controller 30, the compression/decompression processor 110 also applies a predetermined decompression on compressed data stored in a card type recording medium 42 etc. to produce uncompressed data. Note that in the image pickup apparatus 1 of this embodiment, a compression technology implemented in relation to JPEG standard is employed for a still image, while another compression technology implemented in relation to MPEG2 standard or AVC/H. 264 standard is employed for a dynamic picture image.

After executing various processes, such as the later-mentioned electronic blur correction and the compressing processes by the compression/decompression processor 110, the pickup image data stored in the main memory 109 is outputted to the card type recording medium 42 etc. through a card I/F 41, in response to an instruction from the central controller 30.

A SD (Secure Digital) memory card etc. detachable to the image pickup apparatus 1 is available as the card type recording medium 42. However, needless to say, the card type recording medium 42 may be replaced by other recording media, for example, DVD, BD (Blu-ray Disc), flash memory or HDD (Hard Disc Drive) built in the image pickup apparatus 1.

A LCD (Liquid Crystal Display) monitor 44, an operating unit 45 and an input and output terminals 46 are connected to an input and output I/F 43.

The LCD monitor 44 displays images based on various image data. As the images to be displayed, there are, for example, a pickup image and a menu image. Image data corresponding to these images is outputted from the main memory 109.

The operating unit 45 is constructed by operating keys containing a not-shown relay switch and a power switch, an arrow key, a joystick or a touch panel superimposed on the LCD monitor 44 and also adapted so as to accept user's manipulated inputs to the image pickup apparatus 1.

The input and output terminals 46 are connected to a not-shown television monitor, a PC (Personal Computer) or the like. The input and output terminals 46 may be constructed by a HDMI (High-Definition Multimedia Interface) terminal, a USB (Universal Serial Bus) terminal, various output terminals implemented in relation to IEEE 1394 Standard, etc.

Next, respective blocks related to the image blur correcting process of the image pickup apparatus 1 will be described.

An angular velocity sensor 111 detects an angular velocity of the image pickup apparatus 1 caused by user's shaking etc. when taking a dynamic picture image with the image pickup apparatus 1. Signals related to the angular velocity detected by the angular velocity sensor 111 are converted to digital signals by an A/D converter 112 and successively transmitted to the central controller 30 through the bus 150.

In the central controller 30, the image-blur-amount calculation unit 31 calculates an image blur amount S of from the transmitted digital signals related to the angular velocity. The image blur amount S is calculated based on a blur angle θ obtained by the integral of the angular velocity detected by the angular velocity sensor 111. Note that a sensor for detecting an angular acceleration of the image pickup apparatus 1 may be used in place of the angular velocity sensor 111.

In the central controller 30, the shutter-speed calculation unit 32 calculates a shutter speed (exposure time) E of the imaging sensor 104 when the dynamic picture image is taken by the image pickup apparatus 1.

Based on the image blur amount S calculated by the image-blur-amount calculation unit 31 and the shutter speed E calculated by the shutter-speed calculation unit 32, the image-blur-correction control unit 33 executes the controls of the optical blur correction unit 105, a position detector 201, a servo 202 and a CIS driver 203 all related to the optical blur correcting process and/or the controls of the main memory 109 and the read control unit 34 both related to the electronic blur correcting process.

First, respective functions of the optical blur correction unit 105, the position detector 201, the servo 202 and the CIS driver 203 all related to the optical blur correcting process will be described below.

The position detector 201 detects the position of the imaging sensor 104 arranged in the optical blur correction unit 105. The information about position of the imaging sensor 104 detected by the position detector 201 is transmitted to the servo 202.

The image-blur-correction control unit 33 transmits an image blur correction amount for optical blur correction to the servo 202. Then, the servo 202 determines an amount of driving the CIS driver 203 from the information about the position of the imaging sensor 202 and the image blur correction amount for optical blur correction.

The optical blur correction unit 105 is driven by the CIS driver 203. As a result, the optic angle of an incident light on the imaging sensor 104 is changed to perform the image blur correction.

Next, respective functions of the main memory 109 and the read control unit 34 both related to the electronic blur correcting process will be described below.

The image-blur-correction control unit 33 reads out an image blur correction amount for electronic blur correction and transmits it to the read control unit 34. Based on the so-transmitted image blur correction amount for electronic blur correction, the read control unit 34 determines the coordinates of an output (cutout) area of the image data stored in the main memory 109 to perform the image bur correction.

(Optical Blur Correcting Process)

Figure 3:
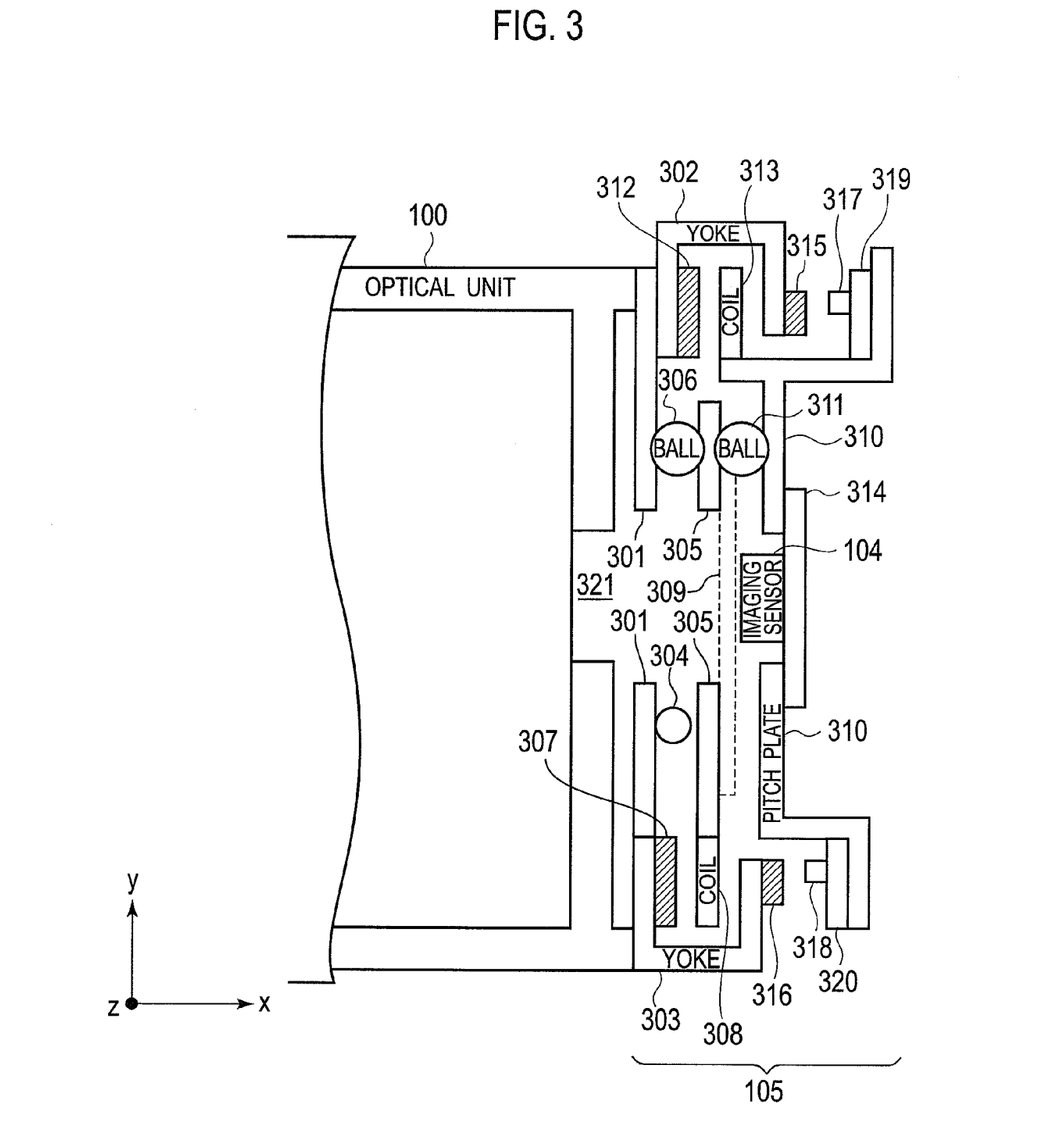
FIG. 3 is a conceptual diagram to explain the optical blur correcting action by an optical blur correction unit 101 of the image pickup apparatus 1 of this embodiment.

The optical blur correcting process of the image pickup apparatus 1 will be described in detail below, based on the operation of the optical blur correction unit 105. FIG. 3 is a side view explaining the operation of optical blur correction by the optical blur correction unit 105 on a conceptual basis. In FIG. 3, an axis parallel to the optical axis in case of taking an image by the image pickup apparatus 1 is defined as x-axis. Also, an up-and-down (vertical) direction perpendicular to x-axis is defined as y-axis in the image pickup apparatus 1, while a left-and-right (horizontal) direction perpendicular to x-axis and y-axis is defined as z-axis in the same apparatus 1.

First, the principle by which the optical blur correction unit 105 moves the imaging sensor 104 on the ground of the driving of the CIS driver 203 will be described. The optical blur correction unit 105 comprises a base plate 301, an upper holder 302, a lower holder 303, a z-shaft 304, a z-plate 305, a rotating ball 306, a magnet 307, a coil 308, a y-shaft 309, y-plate 310, a rotating ball 311, a magnet 312, a coil 313, a fixed unit 314, a magnet 315, a magnet 316, a Hall element 317, a Hall element 318, an attracting yoke 319 and an attracting yoke 320.

The base plate 301 is fixed to the optical unit 100. The upper holder 302 and the lower holder 303 are attached to the base plate 301. The base plate 301 is connected to the z-plate 305 through the z-shaft 304 extending in the direction of z-axis. The rotating ball 306 is disposed between the base plate 301 and the z-plate 305.

In the lower holder 303, the magnet 307 is arranged so as to oppose the coil 308 on the z-plate 305. In this way, the magnet 307 and the coil 308 constitute an actuator for moving the z-plate 305. That is, by controlling electrical voltage supplied to the coil 308, it is possible to slide the z-plate 305 in the direction of z-axis, allowing the magnet 307 and the coil 308 in the lower holder 303 to serve as an actuator for translating the z-plate 305 in the direction of z-axis.

Then, the z-plate 305 is moved in translation along the z-shaft 304. In connection, owing to the usage of the z-shaft 304, the z-plate 305 is not almost displaced relative to the base plate 301 in the direction of y-axis. Consequently, it is possible to slide the z-plate 305 in the direction of z-axis straightly.

In addition, by the translatory motion of the z-plate 305, the rotating ball 306 rotates in not-shown ball bearings provided in the base plate 301 and the z-plate 305. Consequently, it is possible to reduce friction of the z-plate 305 sliding in the direction of z-axis, realizing the fast sliding of the z-plate 305.

The z-plate 305 is connected to the y-plate 310 through the y-shaft 309. The rotating ball 311 is disposed between the y-plate 310 and the z-plate 305.

In the upper holder 302, the magnet 312 is arranged so as to oppose the coil 313 on the y-plate 310. In this way, the magnet 312 and the coil 313 constitute an actuator for moving the y-plate 310. That is, by controlling electrical voltage supplied to the coil 313, it is possible to slide the y-plate 310 in the direction of y-axis, allowing the magnet 312 and the coil 313 in the upper holder 302 to serve as an actuator for translating the y-plate 310 in the direction of y-axis.

Then, the y-plate 310 is moved in translation along the y-shaft 309. In connection, owing to the usage of the y-shaft 309, the y-plate 310 is not almost displaced relative to the base plate 301 in the direction of z-axis. Consequently, it is possible to slide the y-plate 310 in the direction of y-axis straightly.

In addition, by the translatory motion of the y-plate 310, the rotating ball 311 rotates in not-shown ball bearings provided in the z-plate 305 and the y-plate 310. Consequently, it is possible to reduce friction of the y-plate 310 sliding in the direction of y-axis, realizing the fast sliding of the y-plate 310.

With respect to the base plate 301 fixed to the optical unit 100, as mentioned above, the z-plate 305 moves in the direction of z-axis, while the y-plate 310 moves in the direction of y-axis. In addition, as the z-plate 305 and the y-plate 310 are movably connected to the base plate 301, the y-plate 310 also moves in the direction of z-axis in response to the translatory motion in the direction of z-axis. The fixed unit 314 is mounted on the y-plate 310. The imaging sensor 104 is fixed to the y-plate 310 through the fixed unit 314.

Since the optical blur correction unit 105 is constructed as above, the imaging sensor 314 on the fixed unit 314 can move in both directions of y-axis and z-axis.

Next, the detecting of the position of the imaging sensor 104 by the position detector 201 of FIG. 1 will be described.

The magnet 315 and the magnet 316 of FIG. 3 are used for the position detector 201 to detect the position of the imaging sensor 104. The magnet 315 is fixed to the upper holder 302 so as to oppose the Hall element 317. Note that the magnet 315 is fixed to the upper holder 302 so as to overlap with the Hall element 317 in planar view of y-z plane. The Hall element 317 is fixed to the y-plate 310 through the attracting yoke 319.

The Hall element 317 detects a magnetic field that the magnet 315 generates. If the relative position of the magnet 315 to the Hall element 317 changes, then the detection result of the Hall element 317 is changed. By a signal outputted from the Hall element 317 on the ground of this change in the detection result, a variation in the position of the y-plate 310 to the base plate 301 is detected. This variation in the position of the y-plate 310 is equivalent to i.e. a variation in the position of the imaging sensor 104.

Similarly, the magnet 316 is fixed to the lower holder 303 so as to oppose the Hall element 318. Note that the magnet 316 is fixed to the lower holder 303 so as to overlap with the Hall element 318 in planar view of y-z plane. The Hall element 318 is fixed to the y-plate 310 through the attracting yoke 320.

The Hall element 318 detects a magnetic field that the magnet 316 generates. If the relative position of the magnet 316 to the Hall element 318 changes, then the detection result of the Hall element 318 is changed. By a signal outputted from the Hall element 318 on the ground of this change in the detection result, a variation in the position of the y-plate 310 to the base plate 301 is detected. This variation in the position of the y-plate 310 is equivalent to i.e. a variation in the position of the imaging sensor 104.

As mentioned above, the Hall element 317 and the Hall element 318 detect the relative position of the imaging sensor 104 fixed to the y-plate 310 to the base plate 301. Consequently, it is possible to detect a displacement of the y-plate 310 (i.e. the imaging sensor 104) in the direction of y-axis by either one of the Hall elements 317 and 318 and also possible to detect a displacement of the y-plate 310 (the imaging sensor 104) in the direction of z-axis by the other of the Hall elements 317 and 318. That is, the Hall elements 317 and 318 can be used as a linear position sensor.

In this way, the position detector 201 detects the position of the imaging sensor 104 based on respective outputs from the Hall elements 317 and 318. The detection result of the position detector 201 is transmitted to the servo 202. The servo 202 drives the CIS driver 203 based on the information about the position of the imaging sensor 104 and the image blur correction amount for optical blur correction. The CIS driver 203 supplies the coil 308 and the coil 313 with electrical voltage to drive the z-plate 305 and the y-plate 310.

An opening 321 penetrating through the base plate 301, the z-plate 305 and the y-plate 310 is arranged behind respective lenses constituting the optical unit 100. Thus, light transmitted through the lenses passes trough the opening 321 and enters the imaging sensor 104 moving on the yz-plane.

In the above way, the optical blur correcting process of the image pickup apparatus 1 is carried out. Note that in the above-mentioned optical blur correction unit 105, its respective disclosed constituents and their operations are illustrative only. Needless to say, any other constitutions based on the known art can be employed for the optical blur correction unit 105 as long as it can control the position of the imaging sensor.

(Electronic Blur Correcting Process)

Next, the electronic blur correcting process of the image pickup apparatus 1 will be described below, based on the operations of the main memory 109 and the read control unit 305.

As mentioned above, the pickup image data is acquired through the optical unit 100 and the imaging sensor 104 etc. and subsequently stored in the main memory 109. The so-stored pickup image data is divided into a standard imaging area and an electronic blur correcting area. The standard imaging area is an image area to be outputted to the card I/F 41 and the input and output I/F 43. The electronic blur correcting area is an area arranged around the standard imaging area.

Figure 4:
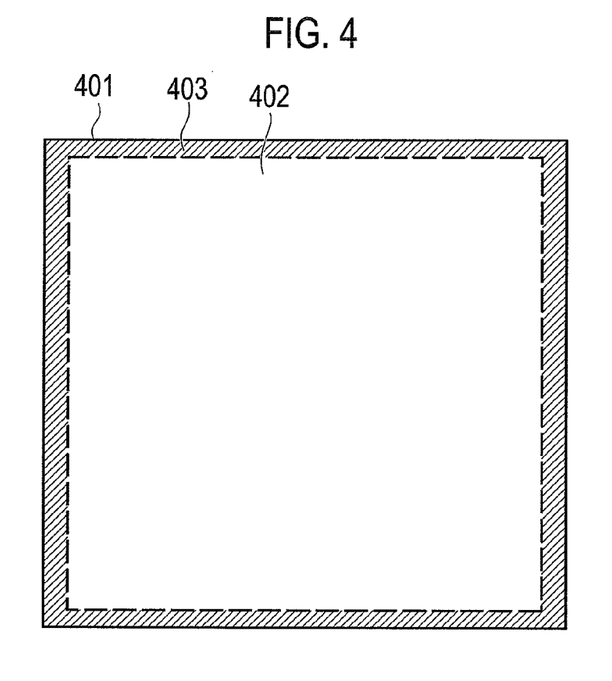
FIG. 4 is a conceptual diagram to explain the electronic blur correcting action by image pickup apparatus 1 of this embodiment.

FIG. 4 shows an image area 401 related to the pickup image data stored in the main memory 109, an effective imaging area 402 and an electronic blur correcting area 403 on a conceptual basis, respectively.

The pickup image data 401 stored in the main memory 109 is constructed by pixel data corresponding to a maximum pixel area that the imaging sensor 104 can acquire. In the central controller 30, the read control unit 34 determines the coordinates of the effective imaging area 402 to be cut out from the pickup image data 401, based on the image blur correction amount for electronic blur correction determined by the image-blur-correction control unit 33. Thus, the pickup image data 401 with the exception of the effective imaging area 402 is discarded as the electronic blur correcting area 403 (an area shown with hatching in FIG. 4).

In this way, the electronic blur correction of the image pickup apparatus 1 is carried out.

Including not only the above-mentioned image pickup apparatus 1 but known apparatuses, generally, there are respective advantages in the optical blur correction and the electronic blur correction, respectively.

In the electronic blur correction, for instance, there is a case that an exposure blurring is easier to occur in a pickup image as the shutter speed of the electronic shutter in the imaging sensor gets slower in taking a dynamic pickup image. On the contrary, the optical blur correction has an advantage of causing an exposure blurring of the pickup image with difficulty, irrespective of the shutter speed of the electronic shutter.

In the electronic blur correction, additionally, there is a case that an exposure blurring is easier to occur in a pickup image as the image blurring due to user's camera shaking etc. in taking an image gets larger. On the contrary, the optical blur correction has an advantage of causing an exposure blurring of the pickup image with difficulty, irrespective of the magnitude of the image blurring.

On the other hand, the power consumption for optical blur correction gets larger than that for electronic blur correction since a drive control to physically move the imaging sensor is executed in the optical blur correction. In other words, the electronic blur correction has an advantage in view of reducing the power consumption of batteries mounted on the image pickup apparatus in comparison with the optical blur correction.

Therefore, according to the image pickup apparatus 1 of this embodiment, the optical blur correction and the electronic blur correction are selected alternatively or used together while changing the image blur correction amounts by both of the methods, based on at least one of the shutter speed and the image blur correction amount in taking an image. As a result, it is possible to accomplish an appropriate image blur correction while utilizing respective advantages of the optical blur correction and the electronic blur correction.

(Switchable Exclusive Use or Combination Use Based on Shutter Speed)

Figure 5:
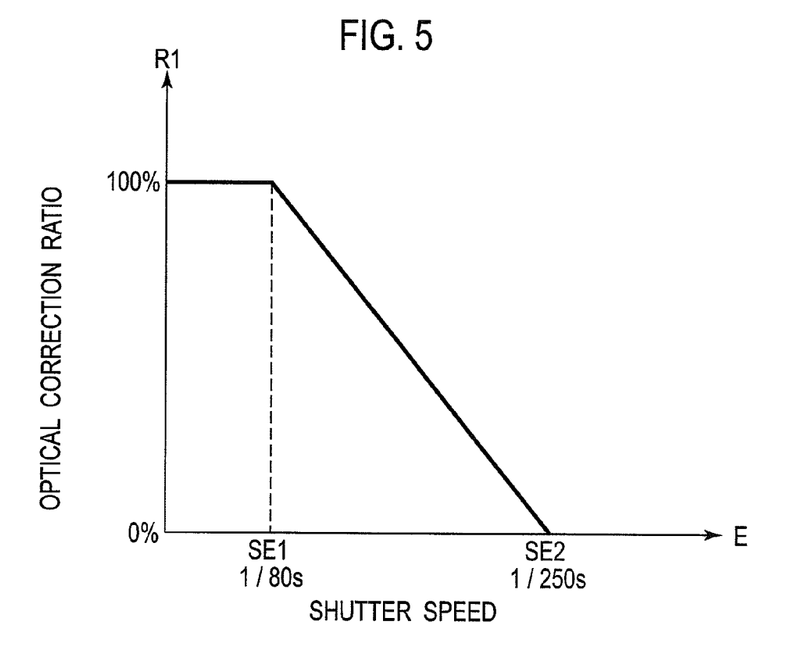
FIG. 5 is a diagram showing a relationship between a shutter speed and an optical correction ratio of this embodiment.

FIG. 5 is a diagram showing a relationship between the shutter speed E calculated by the shutter-speed calculation unit 32 and the ratio R1 of an image blur correction amount of optical blur correction to the total image blur correction amount that the image pickup apparatus 1 corrects an image blur. Note that this ratio R1 will be simply referred to as "optical correction ratio R1" hereinafter.

If the image-blur-correction control unit 33 judges that the shutter speed E calculated by the shutter-speed calculation unit 32 is smaller than a predetermined value SE1, all necessary image blur correction is carried out by the optical blur correction using the optical blur correction unit 105, the position detector 201, the servo 202 and the CIS driver 203, based on the optical correction ratio of 100%. In the example of FIG. 5, if the imaging of a dynamic picture image was performed at the shutter speed less than $1/80$ sec. by the image pickup apparatus 1, all necessary image blur correction is purveyed by the optical blur correction. Note that the above-mentioned predetermined value SE1 may be modified in each case according to user's predilection etc.

Next, if the image-blur-correction control unit 33 judges that the shutter speed E calculated by the shutter-speed calculation unit 32 is equal to or more than the predetermined value SE1 and less than another predetermined value SE2 (e.g. $1/250$ sec. of FIG. 5), it is executed to gradually reduce the optical correction ratio and gradually increase the ratio of an image blur correction amount of electronic blur correction (simply referred to as "electronic correction ratio" hereinafter.), performing the image blur correction by both of the correction methods based on respective correction ratios. Note that the above-mentioned predetermined value SE2 may be modified in each case according to user's predilection etc.

In the above example, if the shutter-speed E calculated by the shutter-speed calculation unit 32 is equal to or more than the predetermined value SE1 and less than the predetermined value SE2, the optical correction ratio is reduced linearly and gradually. However, the optical correction ratio may be gradually reduced in the modification exponentially.

Then, if the image-blur-correction control unit 33 judges that the shutter speed E calculated by the shutter-speed calculation unit 32 is equal to or more than the predetermined value SE2, all necessary image blur correction is carried out by the electronic blur correction using the main memory 109 and the read control unit 34, based on the optical correction ratio of 0%.

According to the image pickup apparatus 1, as mentioned above, by switching the optical blur correction or the electronic blur correction or changing the image blur correction amounts by both of the blur corrections according to the shutter speed, it is possible to perform an appropriate image blur correction while suppressing an occurrence of exposure blurring in the pickup image and an increase in power consumption.

(Switchable Exclusive Use or Combination Use Based on Image Blur Amount)

Figure 6:
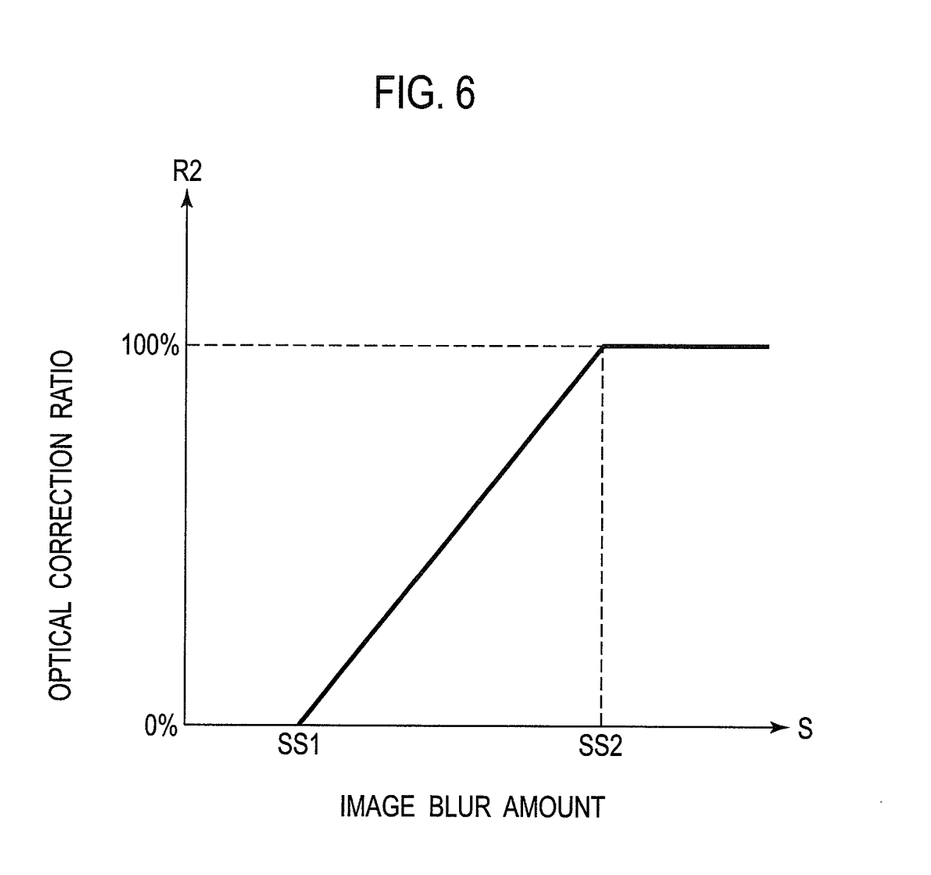
FIG. 6 is a diagram showing a relationship between an image blur amount and an optical correction ratio of this embodiment.

FIG. 6 is a diagram showing a relationship between an image blur amount S calculated by the image-blur-amount calculation unit 31 and an optical correction ratio R2.

If the image-blur-correction control unit 33 judges that the image blur amount S calculated by the image-blur-amount calculation unit 31 is less than a predetermined value SS1, all of the necessary image blur correction is carried out by the electronic blur correction using the main memory 109 and the read control unit 34, based on the optical correction ratio R2 of 0%.

Next, if the image-blur-correction control unit 33 judges that the image blur amount S calculated by the image-blur-amount calculation unit 31 is equal to or more than the above-mentioned predetermined value SS1 and less than another predetermined value SS2, it is executed to gradually increase the optical correction ratio R2 and gradually decrease the electronic correction ratio, performing the image blur correction by both of the correction methods based on respective correction ratios.

In the above example, the optical correction ratio is also reduced linearly and gradually. In the modification, however, the optical correction ratio may be gradually reduced exponentially.

If the image-blur-correction control unit 33 judges that the image blur amount S calculated by the image-blur-amount calculation unit 31 is equal to or more than the predetermined value SS2, all necessary image blur correction is carried out by the optical blur correction using the optical blur correction unit 105, the position detector 201, the servo 202 and the CIS driver 203, based on the optical correction ratio R2 of 100%. Note that the above-mentioned predetermined values SS1 and SS2 may be modified in each case according to user's predilection etc.

According to the image pickup apparatus 1, as mentioned above, by either switching between the optical blur correction and the electronic blur correction or changing the image blur correction amounts by both of the blur corrections according to the image blur amount, it is possible to perform an appropriate image blur correction while suppressing an occurrence of exposure blurring in the pickup image and an increase in power consumption.

(Switchable Exclusive Use or Combination Use Based on Shutter Speed and Image Blur Amount)

Hereinabove, we have described the process of the image pickup apparatus 1 to either switch between the optical blur correction and the electronic blur correction or combine them with each other by changing the image blur correction amounts (altering the ratio of corrections) by both of the blur corrections, according to either one of the shutter speed and the image blur amount. Meanwhile, the image pickup apparatus is also capable of either switching between the optical blur correction and the electronic blur correction or combining them with each other by changing the image blur correction amounts (altering the ratio of corrections) by both of the blur corrections, according to both of the shutter speed and the image blur amount. This process will be described below.

Figure 7:
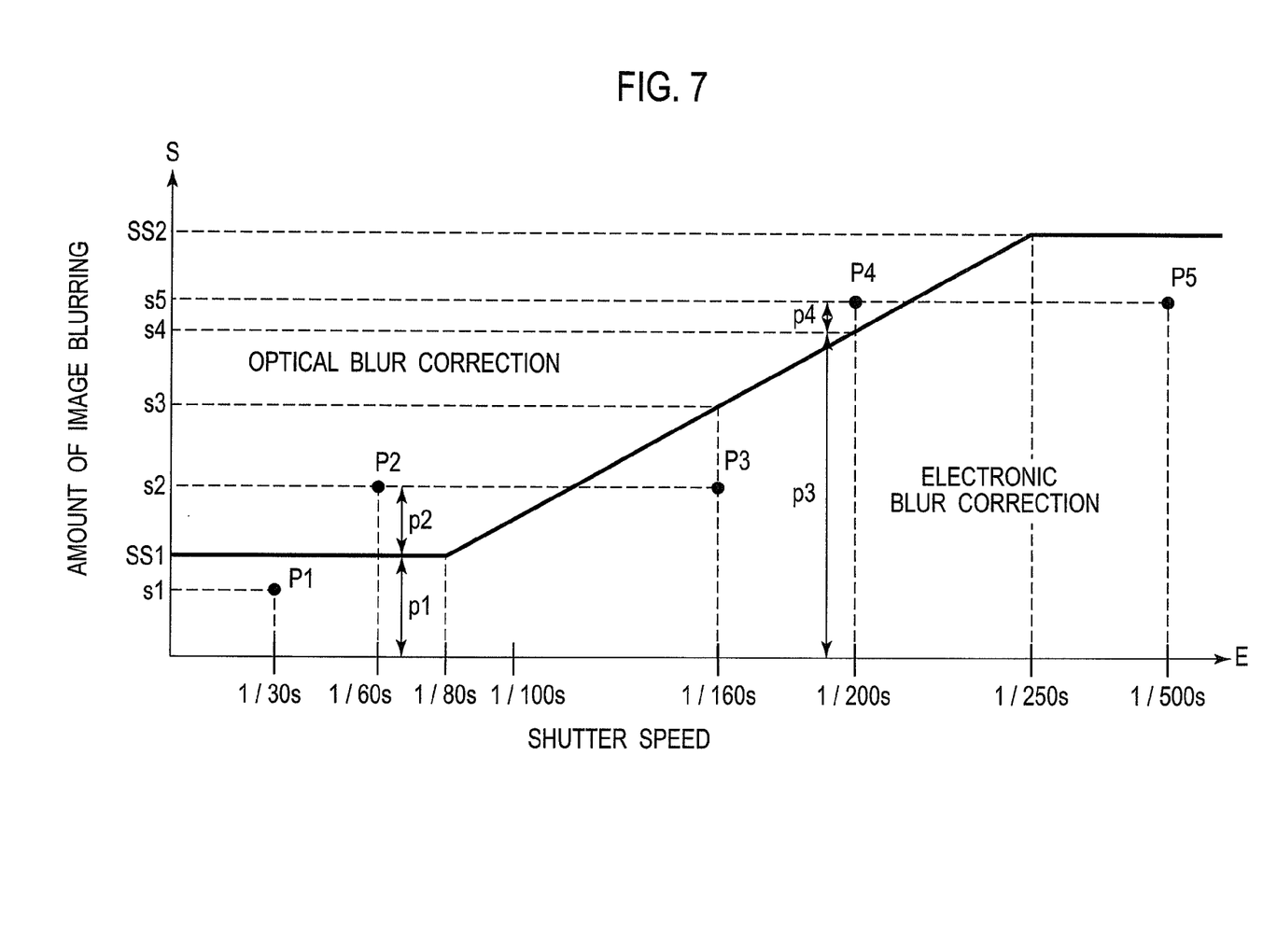
FIG. 7 is a diagram showing a relationship among a shutter speed, an optical blur correction amount and an electronic blur correction amount of this embodiment.

FIG. 7 is a diagram showing a relationship between the shutter speed E calculated by the shutter-speed calculation unit 32 and the image blur amount S calculated by the image-blur-amount calculation unit 31 of the image pickup apparatus 1. The image-blur-correction control unit 33 determines an image blur correction amount by optical blur correction and an image blur correction amount by electronic blur correction based on the shutter speed E and the image blur amount S.

The image blur correction amounts based on both optical blur correction and electronic blur correction that the image-blur-correction control unit 33 determines will be described with reference to FIG. 7, below.

If the shutter speed E calculated by the shutter-speed calculation unit 32 is smaller (slower) than $1/80$ sec. and the image blur amount S calculated by the image-blur-amount calculation unit 31 is smaller than the predetermined SS1, the image-blur-correction control unit 33 executes all the correction of the calculated image blur amount S by electronic blur correction. For instance, when the shutter speed is $1/30$ sec. and the image blur amount is s1 smaller than SS1 (i.e. plotted as P1 in FIG. 7), all of the image blur amount s1 is corrected by electronic blur correction.

If the shutter speed E calculated by the shutter-speed calculation unit 32 is smaller (slower) than $1/80$ sec. and the image blur amount S calculated by the image-blur-amount calculation unit 31 is equal to or larger than the predetermined SS1, the image-blur-correction control unit 33 corrects a blur component SS1 of the calculated image blur amount S by the electronic blur correction and the remaining blur component by the optical blur correction. For instance, when the shutter speed is $1/60$ sec. and the image blur amount is s2 larger than SS1 (i.e. plotted as P2 in FIG. 7), an image blur amount p1 corresponding to SS1 is corrected by electronic blur correction, while an image blur amount p2 corresponding to a difference between s2 and SS1 is corrected by optical blur correction.

If the shutter speed E calculated by the shutter-speed calculation unit 32 is equal to or larger (faster) than $1/80$ sec. and smaller (slower) than $1/250$ sec., the image-blur-correction control unit 33 gradually increases a part of the image blur amount S calculated by the image-blur-amount calculation unit 31, the part being corrected by electronic blur correction, from the predetermined value SS1 to another predetermined value SS2 larger than SS1.

For instance, when the shutter speed is $1/160$ sec. and the calculated image blur amount S is s2 smaller than s3 as a maximum of image blur amount that the image-blur-correction control unit 33 would execute a correction by electronic blur correction under the same shutter speed ($1/160$ sec.) (i.e. plotted as P3 in FIG. 7), all of the image blur amount s2 is corrected by electronic blur correction.

Meanwhile, if the shutter speed is $1/200$ sec. and the calculated image blur amount S is s5 larger than s4 as a maximum of image blur amount that the image-blur-correction control unit 33 would execute a correction by electronic blur correction under the same shutter speed (i.e. plotted as P4 in FIG. 7), an image blur amount p3 corresponding to S4 is corrected by electronic blur correction, while an image blur amount p4 corresponding to a difference between s5 and s4 is corrected by optical blur correction.

In the example shown in FIG. 7, if the shutter speed E calculated by the shutter-speed calculation unit 32 is equal to or more (faster) than $1/80$ sec. and smaller (slower) than $1/250$ sec., then the image blur amount to be corrected by electronic blur correction is increased linearly and gradually. In the modification, however, this image blur amount by electronic blur correction may be gradually increased exponentially.

If the shutter speed E calculated by the shutter-speed calculation unit 32 is equal to or larger (faster) than $1/250$ sec. and the image blur amount S calculated by the image-blur-amount calculation unit 31 is smaller than the predetermined SS2, the image-blur-correction control unit 33 executes all the correction of the calculated image blur amount S by the electronic blur correction. For instance, when the shutter speed is $1/500$ sec. and the image blur amount is s5 smaller than SS2 (i.e. plotted as P5 in FIG. 7), all of the image blur amount s5 is corrected by electronic blur correction.

As the predetermined value SS2 mentioned above, there may be established a limit value that the image pickup apparatus 1 can correct in the image blur amount S calculated by the image-blur-amount calculation unit 31. For instance, this limit value may be determined by a maximum size of electronic blur correcting area that can be ensured around the standard imaging area, coordinates of this area and the position of the imaging sensor 104 that the optical blur correction unit 105 can move.

With the above-mentioned operation, the image pickup apparatus 1 can either switch between the optical blur correction and the electronic blur correction or combine them with each other by changing the image blur correction amounts (altering the ratio of corrections) by both of the blur corrections, according to both of the shutter speed and the image blur amount. Therefore, it is possible to perform an appropriate image blur correction while suppressing an occurrence of exposure blurring in the pickup image and an increase in power consumption.

Modifications of Embodiments (First Modification)

In the above-mentioned image pickup apparatus 1, the optical image-blur correction is accomplished since the optical blur correction unit 105 moves the imaging sensor 104 to change an optic angle of incident light on it. In this connection, the optic angle may be changed by not moving the imaging sensor 104 but arranging a prism on the incident side of the optical unit 100, effecting the optical image-blur correction.

Figure 8:
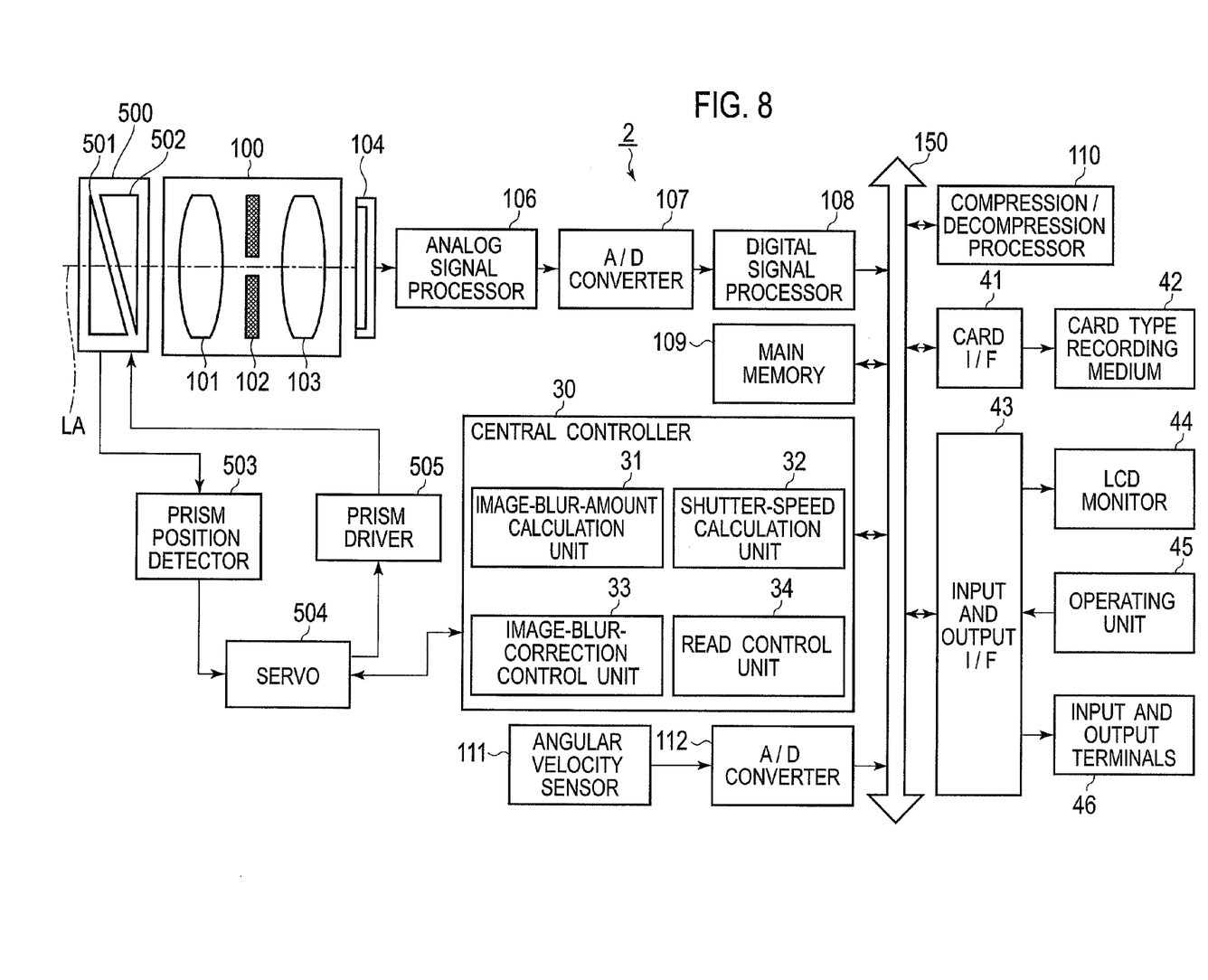
FIG. 8 is a block diagram showing an example of internal constitution of an image pickup apparatus 2 in accordance with a first modification of this embodiment of the present invention.

FIG. 8 is a block diagram showing the internal constitution of an image pickup apparatus 2 executing optical blur correction by a prism unit 500. The appearance of the image pickup apparatus 2 is similar to that of the image pickup apparatus 1 of FIG. 2. In FIG. 8, blocks having their functions similar to those of respective blocks of FIG. 1 are indicated with the same reference numerals respectively and their detailed descriptions are eliminated.

As shown in FIG. 8, the image pickup apparatus 2 has the prism unit 500 arranged on the incident side of the optical unit 100. The prism unit 500 includes two prisms 501 and 502 changing the refractive direction of light incident on the optical unit 100. The prisms 501 and 502 are rotatable about the optical axis LA in a preset given movable range, respectively.

The prism 501 is rotated about the optical axis LA to change the refractive direction of light incident on the optical unit 100 to a horizontal direction. The prism 502 is rotated about the optical axis LA to change the refractive direction of light incident on the optical unit 100 to a vertical direction.

The image-blur-correction control unit 33 determines an image blur amount to be corrected by optical blur correction, based on the image blur amount S calculated by the image-blur-amount calculation unit 31 and/or the shutter speed E calculated by the shutter-speed calculation unit 32. As this process for determination is similar to that of the image pickup apparatus 1, the detailed description is eliminated.

A prism position detector 503 detects the positional information related to the rotations of the prisms 501 and 502 about the optical axis LA. The positional information of the prisms 501 and 502 detected by the prism position detector 503 is transmitted to a servo 504.

Then, the image-blur-correction control unit 33 transmits an image blur correction amount for optical blur correction to the servo 504. Then, the servo 504 determines an amount of driving a prism driver 505 from the information related to the rotations of the prisms 501 and 502 about the optical axis LA and the image blur correction amount for optical blur correction.

The prisms 501 and 502 are driven in rotation about the optical axis LA in a clockwise or counter-clockwise direction by the prism driver 505, respectively. As a result, the optic angle of an incident light on the imaging sensor 104 is changed to perform the image blur correction.

According to the image pickup apparatus 2 related to the first modification, it is possible to switch between the optical blur correction by the prism unit 500 and the electronic blur correction by cutting out the standard imaging area except the electronic blur correcting area from the pickup image data stored in the main memory 109, according to the shutter speed and/or the image blur amount. Alternatively, it is possible to combine this optical blur correction with this electronic blur correction together, according to the shutter speed and/or the image blur amount.

(Second Modification)

Hereinabove, we have described, as the first modification, the image pickup apparatus 2 where the optical image-blur correction is accomplished by changing the optic angle owing to the provision of the prism on the incident side of the optical unit. In addition, the optical image-blur correction provided by changing the optic angle may be accomplished by a shift-lens in the optical unit.

Figure 9:
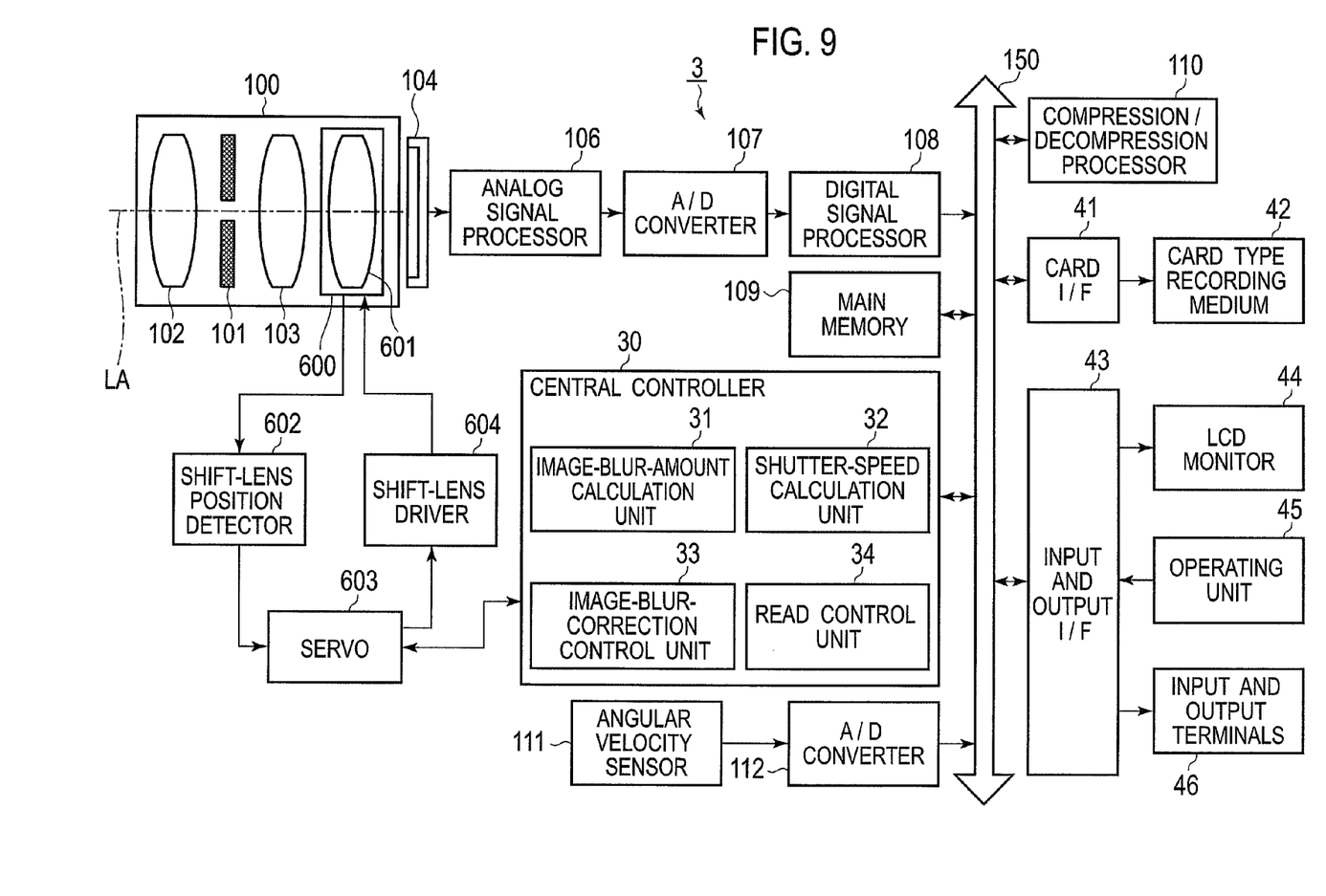
FIG. 9 is a block diagram showing an example of internal constitution of an image pickup apparatus 3 in accordance with a second modification of this embodiment of the present invention.

FIG. 9 is a block diagram showing the internal constitution of an image pickup apparatus 3 executing optical blur correction by a shift-lens unit 600. Similarly to the image pickup apparatus 2, the appearance of the image pickup apparatus 3 is similar to that of the image pickup apparatus 1 of FIG. 2. In FIG. 9, blocks having their functions similar to those of respective blocks of FIG. 1 are indicated with the same reference numerals respectively and their detailed descriptions are eliminated.

As shown in FIG. 9, the image pickup apparatus 3 has the shift-lens unit 600 arranged on the incident side of the optical unit 100. The shift-lens unit 600 includes a shift lens 601 movable to the optical axis LA.

The shift lens 601 is movable in a direction to cancel the image blur relative to the optical axis LA to change the optic angle of an incident light on the imaging sensor 104.

The image-blur-correction control unit 33 determines an image blur amount to be corrected by optical blur correction, based on the image blur amount S calculated by the image-blur-amount calculation unit 31 and/or the shutter speed E calculated by the shutter-speed calculation unit 32. Similarly to the case of the mage pickup apparatus 2, this process for determination is similar to that of the image pickup apparatus 1 and therefore, the detailed description is eliminated.

A shift-lens position detector 602 detects the positional information of the shift lens 601. The positional information of the shift lens 601 detected by the shift-lens position detector 602 is transmitted to a servo 603.

Then, the image-blur-correction control unit 33 transmits an image blur correction amount for optical blur correction to the servo 603. Then, the servo 603 determines an amount of driving a shift-lens driver 604 from the positional information of the shift lens 601 and the image blur correction amount for optical blur correction.

The shift lens 601 is driven by the shift-lens driver 604. As a result, the optic angle of an incident light on the imaging sensor 104 is changed to perform the image blur correction.

According to the image pickup apparatus 3 related to the second modification, it is possible to switch between the optical blur correction by the shift-lens unit 600 and the electronic blur correction by cutting out the standard imaging area except the electronic blur correcting area from the pickup image data stored in the main memory 109, according to the shutter speed and/or the image blur amount. Alternatively, it is possible to combine this optical blur correction with this electronic blur correction together, according to the shutter speed and/or the image blur amount.

Although the implementation means for optical blur correction have been described by the cases of: changing the position of the imaging sensor by the optical image-blur correction unit; changing of the optical axis of light incident on the imaging sensor by the prism unit; and changing of the optical axis of light incident on the imaging sensor by the shift-lens unit, the optical image-blur correction may be implemented by a combination of these means.

In addition, the shutter speed and the image blur amount described in the above examples are illustrative only and therefore, the effect of the present invention can be attained by adopting other values for these characteristics. Alternatively, the shutter speed and the image blur amount may be variable according to user's predilection, imaging condition, etc.

What is claimed is:

1. An image pickup apparatus comprising:
   a main body unit including an imaging unit configured to take a dynamic picture image and a memory unit configured to temporarily store the dynamic picture image taken by the imaging unit;
   an image-blur-amount calculation unit configured to calculate an image blur amount of the dynamic picture image, based on a blur of the main body unit in taking the dynamic picture image;
   an optical correction unit configured to optically correct an image blur of the dynamic picture image by correcting an incident light on the imaging unit;
   an electronic correction unit configured to electronically correct the image blur of the dynamic picture image by cutting out an image having a designated area from the dynamic picture image temporarily memo unit;

a shutter-speed calculation unit configured to calculate a shutter speed of the imaging unit; and an image-blur-correction control unit configured to execute control of calculating an optical correction amount by the optical correction unit and allowing the optical correction unit to optically correct the image blur based on the optical correction amount, and also calculating an electronic correction amount by the electronic correction unit and allowing the electronic correction unit to electronically correct the image blur based on the electronic correction amount, based on at least one of the amount of image blur and the shutter speed both calculated, wherein the image-blur-correction control unit sets the optical correction amount to zero when the shutter speed calculated by the shutter-speed calculation unit is equal to or more than a first threshold value, and wherein the image-blur-correction control unit is configured to calculate the electronic correction amount so that a maximum correction amount of the electronic correction amount is increased more gradually as the shutter speed calculated gets more quickly when the shutter speed calculated by the shutter-speed calculation unit is equal to or more than a second threshold value smaller than the first threshold value and is less than the first threshold value.

2. The image pickup apparatus of claim 1, wherein the image-blur-correction control unit is configured to:

calculate a specific value as the electronic correction amount when the shutter speed calculated by the shutter-speed calculation unit is less than the second threshold value;

set the optical correction amount to zero when the amount of image blur calculated is equal to or less than the specific value; and set a difference between the amount of image blur calculated and the specific value to the optical correction amount when the amount of image blur calculated is more than the specific value.

3. The image pickup apparatus of claim 2, wherein the image-blur-correction control unit is configured to:

calculate the electronic correction amount so that the maximum correction amount is increased more gradually as the shutter speed calculated gets more quickly when the shutter speed calculated by the shutter-speed calculation unit is equal to or more than the second threshold value and less than the first threshold value and when the amount of image blur calculated by the image-blur-amount calculation unit is equal to or more than a third threshold value identical to the specific value and less than a fourth threshold value larger than the third threshold value;

set the optical correction amount to zero when the amount of image blur calculated is equal to or less than the maximum correction amount; and set a difference between the amount of image blur calculated and the maximum correction amount to the optical correction amount when the amount of image blur calculated is more than the maximum correction amount.

4. An image pickup apparatus comprising:

a main body unit including an imaging unit configured to take a dynamic picture image and a memory unit configured to temporarily store the dynamic picture image taken by the imaging unit;

an image-blur-amount calculation unit configured to calculate an image blur amount of the dynamic picture image, based on a blur of the main body unit in taking the dynamic picture image;

an optical correction unit configured to optically correct an image blur of the dynamic picture image by correcting an incident light on the imaging unit;

an electronic correction unit configured to electronically correct the image blur of the dynamic picture image by cutting out an image having a designated area from the dynamic picture image temporarily stored in the memory unit;

a shutter-speed calculation unit configured to calculate a shutter speed of the imaging unit; and an image-blur-correction control unit configured to execute control of calculating an optical correction amount by the optical correction unit and allowing the optical correction unit to optically correct the image blur based on the optical correction amount, and also calculating an electronic correction amount by the electronic correction unit and allowing the electronic correction unit to electronically correct the image blur based on the electronic correction amount, based on at least one of the amount of image blur and the shutter speed both calculated, wherein the image-blur-correction control unit is configured to set the optical correction amount to zero when the image blur amount calculated by the image-blur-amount calculation unit is less than a third threshold value, and wherein the image-blur-correction control unit is configured to set the electronic correction amount to zero when the image blur amount calculated by the image-blur-amount calculation unit is equal to or more than a fourth threshold value.

5. The image pickup apparatus of claim 4, wherein the image-blur-correction control unit is configured to calculate the optical correction amount so that a maximum correction amount of the optical correction amount is increased more gradually as the image blur amount calculated gets larger when the image blur amount calculated by the image-blur-amount calculation unit is equal to or more than the third threshold value and is less than the fourth threshold value.

6. An image blur correcting method comprising:

storing a dynamic picture image taken by an imaging unit of an image pickup apparatus in a memory unit, temporarily;

calculating an image blur amount of the dynamic picture image, based on a blur of the image pickup apparatus in taking the dynamic picture image;

calculating a shutter speed in taking the dynamic picture image; and calculating an optical correction amount and further correcting the image blur based on the optical correction amount optically, and also calculating an electronic correction amount and further correcting the image blur based on the electronic correction amount electronically;

setting the optical correction amount to zero when the shutter speed is equal to or more than a first threshold value; and calculating the electronic correction amount so that a maximum correction amount of the electronic correction amount is increased more gradually as the shutter speed calculated gets more quickly when the shutter speed is equal to or more than a second threshold value smaller than the first threshold value and is less than the first threshold value.

* * * * *

UNITED STATES PATENT AND TRADEMARK OFFICE
CERTIFICATE OF CORRECTION

| | | |
|---|---|---|
| PATENT NO. | : 9,025,039 B2 | Page 1 of 1 |
| APPLICATION NO. | : 13/713816 | |
| DATED | : May 5, 2015 | |
| INVENTOR(S) | : Hidehiro Katoh et al. | |

It is certified that error appears in the above-identified patent and that said Letters Patent is hereby corrected as shown below:

In The Claims

Claim 6, Column 16, Line 58: please delete "and".

Signed and Sealed this
Seventeenth Day of November, 2015

Michelle K. Lee
*Director of the United States Patent and Trademark Office*